(12) United States Patent
Ellwood, III et al.

(10) Patent No.: US 9,267,441 B1
(45) Date of Patent: Feb. 23, 2016

(54) MULTI-PIECE PISTON RING FOR A TURBOCHARGER SHAFT ASSEMBLY

(71) Applicant: BorgWarner Inc., Auburn Hills, MI (US)

(72) Inventors: Erwin Perry Ellwood, III, Candler, NC (US); Sean Hastings, Arden, NC (US)

(73) Assignee: BORGWARNER INC., Auburn Hills, MI (US)

( * ) Notice: Subject to any disclaimer, the term of this patent is extended or adjusted under 35 U.S.C. 154(b) by 0 days.

(21) Appl. No.: 14/660,114

(22) Filed: Mar. 17, 2015

(51) Int. Cl.
*F02C 7/28* (2006.01)
*F16J 15/34* (2006.01)
*F02C 6/12* (2006.01)
*F04D 29/10* (2006.01)

(52) U.S. Cl.
CPC ... *F02C 7/28* (2013.01); *F02C 6/12* (2013.01); *F04D 29/10* (2013.01); *F16J 15/346* (2013.01); *F16J 15/3464* (2013.01); *F05D 2220/40* (2013.01); *F05D 2240/58* (2013.01); *F05D 2260/98* (2013.01)

(58) Field of Classification Search
CPC ........... F16J 15/16; F16J 15/44; F16J 15/442; F16J 15/443; F16J 5/346; F16J 5/3464; F04D 29/10; F04D 29/102; F04D 29/12; F04D 29/122; F02C 6/12; F02C 7/28; F05D 2220/40; F05D 2240/58; F05D 2260/98

USPC ................. 277/548, 560; 417/423.11–423.14
See application file for complete search history.

(56) References Cited

U.S. PATENT DOCUMENTS

| | | | |
|---|---|---|---|
| 3,097,855 A * | 7/1963 | Allen | 277/584 |
| 3,716,245 A * | 2/1973 | Turolla | 277/584 |
| 7,008,194 B2 | 3/2006 | Frankenstein | |
| 7,134,836 B2 | 11/2006 | Scherrer | |
| 8,465,261 B2 | 6/2013 | Holzschuh | |
| 2005/0188694 A1* | 9/2005 | Frankenstein | 60/602 |

FOREIGN PATENT DOCUMENTS

EP 1 394 451 B1 1/2007

* cited by examiner

*Primary Examiner* — Charles Freay
*Assistant Examiner* — Philip Stimpert
(74) *Attorney, Agent, or Firm* — Young Basile Hanlon & MacFarlane P.C.

(57) ABSTRACT

An apparatus includes a bearing housing, a shaft assembly that extends through the bearing housing along a shaft axis, an annular groove formed on the shaft assembly, and a piston ring assembly that is engaged with the bearing housing and extends into the groove of the shaft assembly. The piston ring assembly includes a first ring portion and a second ring portion. The first ring portion has a first contact face that is oriented at a non-perpendicular with respect to the shaft axis, and the second ring portion has a second contact face that is oriented at a non-perpendicular angle with respect to the shaft axis and is engageable with the first contact face.

19 Claims, 3 Drawing Sheets

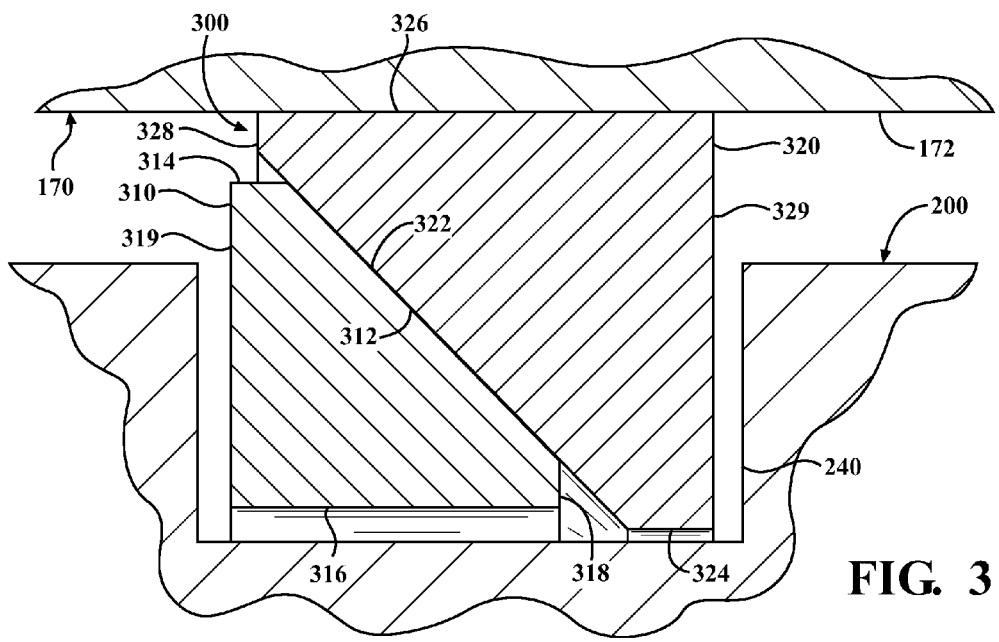
FIG. 3
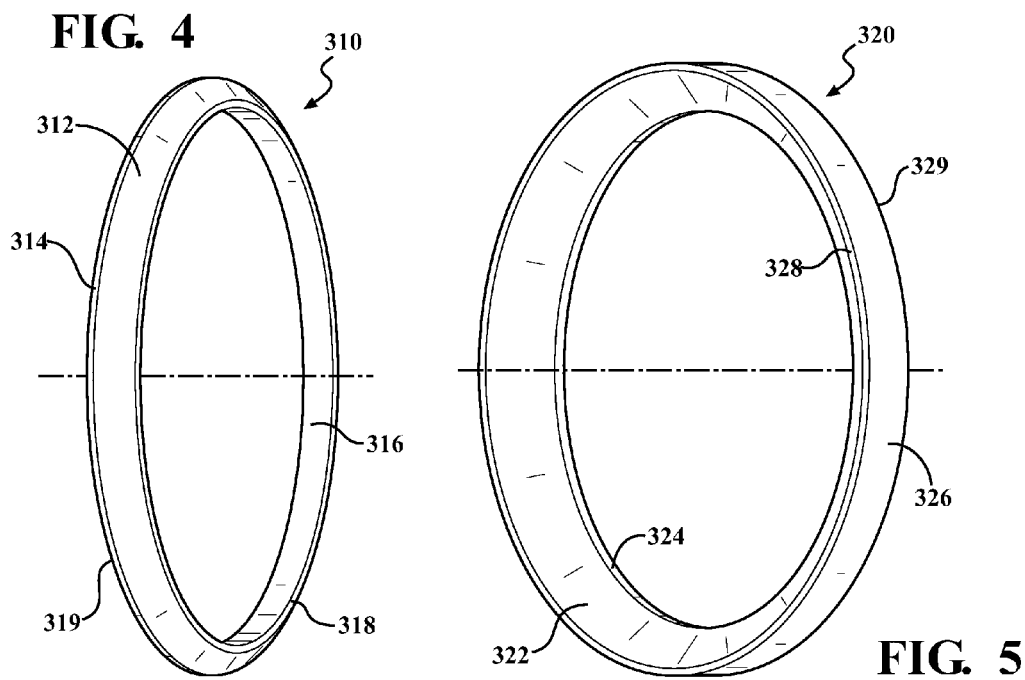
FIG. 4
FIG. 5

MULTI-PIECE PISTON RING FOR A TURBOCHARGER SHAFT ASSEMBLY

BACKGROUND

In the field of internal combustion engines, turbochargers are forced-induction devices that are utilized to increase the pressure of the intake air provided to the engine. Exhaust gases from the engine are routed to the turbocharger and are utilized to drive a turbine wheel. The rotational force generated by the turbine wheel is utilized to drive a compressor wheel, which pressurizes ambient intake air and supplies the pressurized intake air to the engine. By pressurizing the intake air, the amount of air and fuel that can be forced into each cylinder during an intake stroke of the engine is increased. This produces an increased power output relative to a naturally-aspirated engine.

The turbine wheel is connected to the compressor wheel by a shaft, with the turbine wheel being joined to a first end of the shaft and the compressor wheel being connected to a second end of the shaft. The shaft passes through a bearing housing and is supported by a plurality of bearings that allow the shaft to spin with respect to the bearing housing at extremely high rotational speeds. The bearings are lubricated by oil, for example, via an oil line that delivers pressurized engine oil to the bearing housing from the oil pump of the engine.

At each end of the bearing housing, the shaft exits the bearing housing and enters either the turbine housing or the compressor housing. Piston rings are utilized at each end of the housing to prevent oil from exiting the bearing housing along the shaft. In particular, the piston rings are seated against the bearing housing or a component within the bearing housing in a manner that restrains rotation of the piston rings with respect to the bearing housing. The piston rings extend into respective grooves that are formed on the shaft.

The grooves on the shaft are formed such that they are wider than the piston rings. This axial clearance between the piston ring and the groove helps to prevent excessive contact between the piston ring and the groove. The axial clearance is typically between 20 microns and 100 microns.

The term "blow by" refers to oil that travels past the piston rings. Axial clearance is a primary controlling factor for blow by for a given pressure differential across a piston ring. As axial clearance increases, blow by increases.

SUMMARY

One aspect of the disclosed embodiments is an apparatus that includes a bearing housing, a shaft assembly that extends through the bearing housing along a shaft axis, an annular groove formed on the shaft assembly, and a piston ring assembly that is engaged with the bearing housing and extends into the groove of the shaft assembly. The piston ring assembly includes a first ring portion and a second ring portion. The first ring portion has a first contact face that is oriented at a non-perpendicular angle with respect to the shaft axis, and the second ring portion has a second contact face that is oriented at a non-perpendicular angle with respect to the shaft axis and is engageable with the first contact face.

Another aspect of the disclosed embodiments is a turbocharger that includes a bearing housing, a compressor housing, a turbine housing, and a shaft assembly that extends through the bearing housing along a shaft axis. The shaft assembly includes a shaft, a compressor wheel that is disposed in the compressor housing and is connected to the shaft, and a turbine wheel that is disposed in the turbine housing and is connected to the shaft. An annular groove is formed on the shaft assembly. A piston ring assembly is engaged with the bearing housing and extends into the groove of the shaft assembly. The piston ring assembly includes a first ring portion and a second ring portion. The first ring portion has a first contact face that is oriented at a non-perpendicular angle with respect to the shaft axis. The second ring portion has a second contact face that is oriented at a non-perpendicular angle with respect to the shaft axis and is engageable with the first contact face.

Another aspect of the disclosed embodiments is an apparatus that includes a stationary structure, a rotating structure that extends along an axis and includes an annular groove, and a piston ring assembly. The piston ring assembly is engaged with the stationary structure and extends into the annular groove of the rotating structure. The piston ring assembly includes a first ring portion and a second ring portion, the first ring portion having a first contact face that is oriented at a non-perpendicular angle with respect to the axis, and the second ring portion having a second contact face that is oriented at a non-perpendicular angle with respect to the axis and is engageable with the first contact face.

BRIEF DESCRIPTION OF THE DRAWINGS

The description herein makes reference to the accompanying drawings, wherein like referenced numerals refer to like parts throughout several views, and wherein:

FIG. 3 is a cross-section view showing a piston ring assembly installed with respect to a bearing housing and the shaft assembly;

FIG. 4 is a perspective view showing a first ring portion of the piston ring assembly; and FIG. 5 is a perspective view showing a second ring portion of the piston ring assembly.

DETAILED DESCRIPTION

The disclosure herein is directed to a multi-piece piston ring for a turbocharger shaft assembly.

Testing has shown a correlation between thrust load and measured blow by. The axial position of the turbine wheel and shaft changes in response to thrust load. As this happens, the position of the piston ring with respect to the groove changes. When the piston ring is centered in the groove, blow by increases. When the piston ring is close to an end of the groove due to a change in the axial position of the turbine wheel and shaft, blow by decreases.

In the implementations described herein, a multi-piece piston ring having two or more pieces is located in a single groove. Contact surfaces are formed on each of the two or more pieces of the piston ring. The contact surfaces can be defined as a portion of the surface of a cone having its axis aligned with the axis of the piston ring. This allows the width of the piston ring to expand and contract in response to axial movement of the turbine wheel and the shaft, with the angle of the contact surfaces controlling the degree by which the multi-piece ring expands and contracts in response to changes in thrust load.

Figure 1:
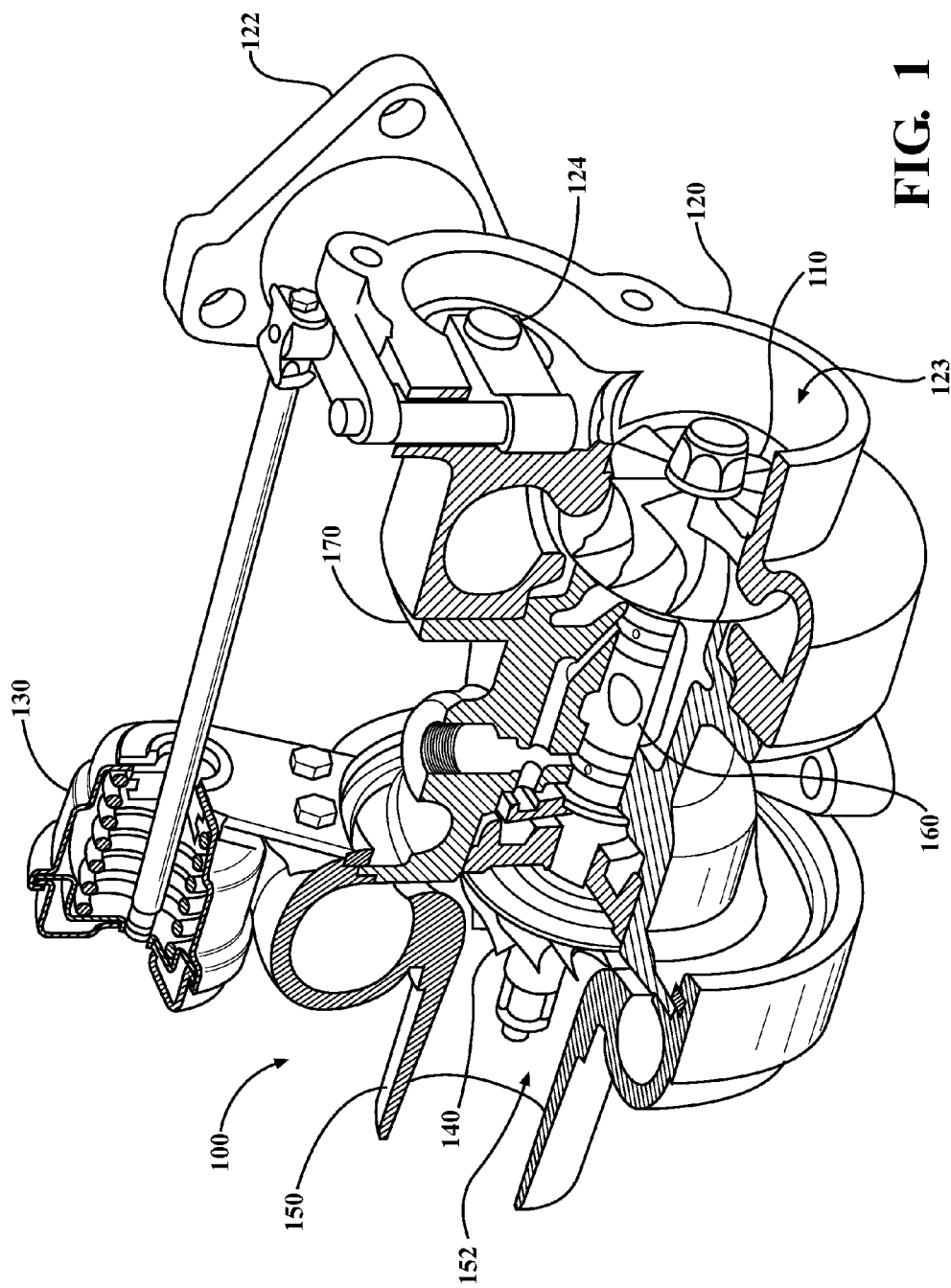
FIG. 1 is a perspective partial cross-section illustration showing a turbocharger.

FIG. 1 shows a turbocharger 100. The turbocharger 100 is an exhaust-gas driven forced induction device that is utilized in conjunction with an internal combustion engine (not shown).

The turbocharger 100 includes a turbine wheel 110, which will be described further herein. The turbine wheel 110 is located in a turbine housing 120. The turbine housing 120 includes an exhaust gas inlet 122 for receiving exhaust gas from the internal combustion engine. Exhaust gases are routed from the exhaust gas inlet 122 to the turbine wheel 110 before exiting the turbine housing 120 at an exhaust gas outlet 123. A wastegate 124 may be mounted in the turbine housing 120 to allow some or all of the exhaust gas to bypass the turbine wheel 110. The wastegate 124 is movable between an open position and a closed position by a control device 130.

The turbocharger includes a compressor wheel 140. The compressor wheel 140 is located in a compressor housing 150. The compressor housing 150 includes an intake air inlet 152 and an intake air outlet (not shown). Intake air is routed from the intake air inlet 152 to the compressor wheel 140, where the intake air is pressurized by rotation of the compressor wheel 140. The intake air then exits the compressor housing 150 at the intake air outlet before being supplied to the internal combustion engine.

Rotation of the compressor wheel 140 is driven by rotation of the turbine wheel 110. In particular, the turbine wheel 110 and the compressor wheel 140 are each connected to a shaft 160. The shaft 160 can be a substantially rigid member, and each of the turbine wheel 110 and the compressor wheel 140 can be connected to the shaft 160 in a manner that prevents rotation of the turbine wheel 110 and the compressor wheel 140 with respect to the shaft 160. As a result, the compressor wheel 140 can rotate in unison with the turbine wheel 110 in response to rotation of the turbine wheel 110.

The shaft 160 is supported within a bearing housing 170 such that it is able to rotate freely with respect to the bearing housing 170 at a very high rotational speed. The bearing housing 170, the turbine housing 120, and the compressor housing 150 are all arranged along an axis of rotation of the shaft 160. In particular, the bearing housing 170 is positioned between the turbine housing 120 and the compressor housing 150, with a first end of the bearing housing 170 being connected to the turbine housing 120 and a second end of the bearing housing 170 being connected to the compressor housing 150. The bearing housing 170 can incorporate lubrication and/or cooling features.

Figure 2:
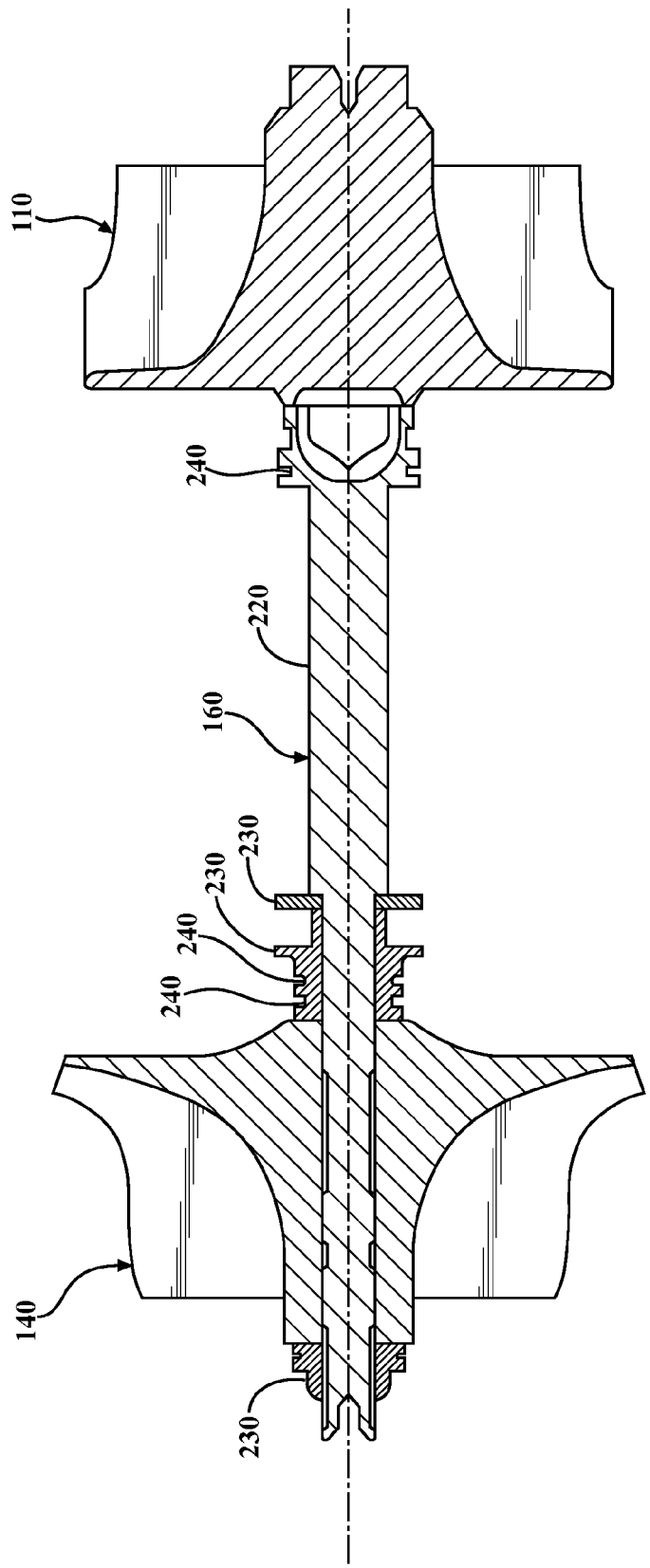
FIG. 2 is a cross-section view showing a shaft assembly.

FIG. 2 shows a shaft assembly 200 that includes the turbine wheel 110, the compressor wheel 140, and the shaft 160. The shaft assembly 200 extends along a shaft axis 210, with the shaft axis 210 passing through the shaft 160 and through the respective centers of rotation of the turbine wheel 110 and the compressor wheel 140.

The shaft 160 can include a primary portion 220 and one or more secondary portions 230. The primary portion 220 extends along the shaft axis 210 from a first end that is connected to the turbine wheel 110, such as by welding or brazing, to a second end where the primary portion 220 terminates outward from the compressor wheel 140. The one or more secondary portions 230 of the shaft 160 are fixed to the primary portion 220 such that the primary portion 220 and one or more secondary portions 230 rotate in unison. The secondary portions 230 can include structures such as fasteners and hubs. In the description herein, structures described as being defined on the shaft 160 can be defined on either or both of the primary portion 220 and the secondary portion 230.

One or more annular grooves 240 are formed on the shaft assembly. Each of the annular grooves 240 is circular, with its center being aligned with the shaft axis 210, and lying in a plane that is perpendicular to the shaft axis 210. The one or more annular grooves 240 can be formed on any or all of the shaft 160, the turbine wheel 110, and the compressor wheel 140. In the illustrated example, the annular grooves are formed on the primary portion 220 of the shaft 160 and the secondary portion 230 of the shaft 160 adjacent to each of the turbine wheel 110 and the compressor wheel 140.

FIG. 3 shows a piston ring assembly 300. The piston ring assembly 300 includes a first ring portion 310 and a second ring portion 320. The piston ring assembly 300 is in engagement with a surface 172 of the bearing housing 170. Engagement of the piston ring assembly 300 with the surface 172 of the bearing housing 170 restrains rotation of the piston ring assembly 300 with respect to the bearing housing 170. Persons of skill in the art will recognize that the bearing housing 170 can be a multi-part structure and that the surface 172 can be formed on any of the parts of the bearing housing 170. In addition, although the piston ring assembly 300 extends into the annular groove 240 of the shaft assembly 200 such that the piston ring assembly 300 is at least partially disposed within the annular groove 240, the piston ring assembly 300 does not rotate in response to rotation of the shaft assembly 200 during normal operation. On the contrary, the shaft assembly 200 normally rotates with respect to the bearing housing 170 and the piston ring assembly 300 while the piston ring assembly 300 remains fixed with respect to the bearing housing 170.

As shown in FIG. 4, the first ring portion 310 includes a first contact face 312. The first contact face 312 is an angled face that extends around the shaft axis 210. When assembled with respect to the bearing housing 170 and the shaft assembly 200, the first contact face 312 is oriented at a non-perpendicular angle with respect to the shaft axis 210. In particular, the first contact face 312 is oriented such that it faces outward with respect to the shaft axis 210 and defines a first angle with respect to the shaft axis 210. The first contact face 312 can be aligned and arranged with respect to the shaft axis 210 such that it is defined as a portion of the surface of an imaginary cone constructed on the shaft axis 210 with the opening angle of the imaginary cone being twice the first angle. The first contact face 312 is configured for engagement with the second ring portion 320, as will be explained further herein.

The first ring portion 310 also includes an outer surface 314 that is formed on the exterior of the first ring portion 310, facing away from the shaft axis 210. The outer surface 314 is an annular surface that is positioned at a constant radius from a center axis of the first ring portion 310 with the center axis of the first ring portion 310 being aligned with the shaft axis 210 when assembled.

The first ring portion 310 also includes an inner surface 316. The inner surface 316 extends at a constant radius with respect to the center axis of the first ring portion 310. When assembled with respect to the shaft assembly 200, the inner surface 316 faces inward toward the shaft axis 210 of the shaft assembly 200 and thus faces the interior of the annular groove 240 that is defined on the shaft assembly 200. A first axial surface 318 extends in a plane that is perpendicular to the center axis of the first ring portion 310 and extends from the inner surface 316 to the first contact face 312. A second axial surface 319 is opposite the first axial surface 318 and likewise extends in a plane that is oriented perpendicular to the center axis of the first ring portion 310. The second axial surface 319 extends from the inner surface 316 to the outer surface 314.

As shown in FIG. 5, the second ring portion 320 includes a second contact face 322. The second contact face 322 is an angled face that extends around the shaft axis 210. The second contact face, when assembled with respect to the bearing housing 170 and the shaft assembly 200, is oriented at a non-perpendicular angle with respect to the shaft axis 210. In particular, the second contact face defines a second angle with respect to the shaft axis and is oriented such that it faces inward with respect to the shaft axis. The second contact face 322 can be aligned and arranged with respect to the shaft axis 210 such that it is defined as a portion of the surface of an imaginary cone constructed on the shaft axis 210 with the opening angle of the imaginary cone being twice the second angle.

The second contact face 322 is adapted to engage the first contact face 312 of the first ring portion 310. In order to facilitate engagement of the first contact face 312 with the second contact face 322, the first angle defined by the first contact face 312 and the second angle defined by the second contact face 322 are supplementary angles, that is, the sum of the first angle and the second angle is 180°.

The second ring portion also includes an inner surface 324 that is arranged at a constant radius from the center axis of the second ring portion 320. The inner surface 324 is oriented toward the shaft axis 210 of the shaft assembly 200 as well as the interior of the annular groove 240. Opposite the inner surface 324 and outer surface 326 of the second ring portion 320 faces outward with respect to the shaft axis 210 and is positioned at a constant radius from the center axis of the second ring portion 320. The outer surface 326 is configured to engage the surface 172 of the bearing housing 170. A first axial surface 328 extends outward from the second contact face 322 to the outer surface 326. Opposite the first axial surface 328, a second axial surface 329 extends outward from the inner surface 324 to the outer surface 326.

With further reference to FIG. 3, it will be appreciated that the various surfaces of the first ring portion 310 and the second ring portion 320 provide for sealing of the piston ring assembly 300 with respect to the surface 172 of the bearing housing 170, as well as the annular groove 240 of the shaft assembly 200. In order to reduce the occurrence of blow by in response to changes in the thrust load that is applied to the shaft assembly 200, interaction of the first contact face 312 and the second contact face 322 is operable to cause expansion or contraction of an axial length of the piston ring assembly 300. By allowing expansion and contraction of the axial dimension of the piston ring assembly 300, the axial clearance between the piston ring assembly 300 and the annular groove 240 is decreased, which results in a decrease in blow by. The interaction force between the first ring portion 310 and the second ring portion 320 acts normal to the first contact face 312 and the second contact face 322. This force has two components, a separation force that acts in the direction of the shaft axis 210 and a retention force that acts in the direction perpendicular to the shaft axis 210. The first angle and the second angle can be tuned to balance the retention and separation forces. For example, if the angle is too high, the separation force will be too great, causing excessive wear from contact of the piston ring assembly 300 with the annular groove 240 of the shaft assembly 200. If the angle is too low, the first ring portion 310 and the second ring portion 320 will not expand axially, which will cause an increase in blow by.

Although the description has been made with respect to a two-piece piston ring, persons of skill in the art will understand that piston rings having more than two pieces can be formed similarly. For example, a three piece piston ring could be formed by modifying the second ring portion 320 to include two opposed second contact faces 322, and by adding an additional piston ring portion similar to the first piston ring portion 310 having a contact face that engages the added contact face of the second ring portion 320.

It should be understood that the piston ring assembly 300 can be utilized with apparatuses other than turbochargers, especially with respect to any rotating structure that rotates with respect to a stationary structure, with the manner of implementation being as described with the shaft assembly 200 and the bearing housing 170. As an example, the piston ring assembly could be utilized in conjunction with turbocharger wastegate and VTG/VGT pivot shafts in which the piston ring assembly would likewise be engaged in a bore and extend into a groove on a shaft that rotates either unidirectionally or bi-directionally.

In operation, the piston ring assembly 300 is installed with respect to the bearing housing 170 or other stationary structure such that it extends into the annular groove 240 of the shaft assembly 200, or of any other rotating shaft assembly that experiences an axial thrust load during rotation. As the shaft assembly 200 moves axially in response to changes in the thrust load, the piston ring assembly 300 expands and contracts to reduce the axial clearance between the piston ring assembly 300 and the annular groove 240, thereby reducing blow by.

While the disclosure has been made in connection with what is presently considered to be the most practical and preferred implementation, it should be understood that the disclosure is intended to cover various modifications and equivalent arrangements.

The invention claimed is:

1. An apparatus, comprising:
a bearing housing;
a shaft assembly that extends through the bearing housing along a shaft axis;
an annular groove that is formed on the shaft assembly and extends around the shaft axis; and
a piston ring assembly that is engaged with the bearing housing and extends into the annular groove of the shaft assembly, the piston ring assembly including a first ring portion and a second ring portion, the first ring portion having a first contact face that is oriented at a non-perpendicular angle with respect to the shaft axis, and the second ring portion having an outer surface that is engaged with the bearing housing and a second contact face that is oriented at a non-perpendicular angle with respect to the shaft axis and is engageable with the first contact face, wherein the first contact face is oriented such that it faces outward with respect to the shaft axis and the second contact face is oriented such that it faces inward with respect to the shaft axis.

2. The apparatus of claim 1, wherein the first contact face defines a first angle with respect to the shaft axis, the second contact face defines a second angle with respect to the shaft axis, and the first angle and the second angle are supplementary angles.

3. The apparatus of claim 1, wherein interaction of the first contact face and the second contact face causes expansion or contraction of an axial length of the piston ring assembly in response to changes in a thrust load applied to the shaft assembly.

4. The apparatus of claim 1, wherein engagement of the piston ring assembly with the bearing housing restrains rotation of the piston ring assembly with respect to the bearing housing.

5. The apparatus of claim 1, wherein the first ring portion includes an inner surface that is arranged around the shaft axis at a constant radius for sealing with respect to the shaft assembly.

6. The apparatus of claim 1, wherein the second ring portion includes an outer surface that is arranged around the shaft axis at a constant radius for sealing with respect to the bearing housing.

7. The apparatus of claim 1, wherein the shaft assembly includes a turbine wheel.

8. The apparatus of claim 1, wherein the shaft assembly includes a compressor wheel.

9. The apparatus of claim 1, wherein the first contact face and the second contact face are each defined as a portion of a conical surface having its axis aligned with the shaft axis.

10. A turbocharger, comprising:
a bearing housing;
a compressor housing;
a turbine housing;
a shaft assembly that extends through the bearing housing along a shaft axis, the shaft assembly including a shaft, a compressor wheel that is disposed in the compressor housing and is connected to the shaft, and a turbine wheel that is disposed in the turbine housing and is connected to the shaft;
an annular groove that is formed on the shaft assembly an extends around the shaft axis; and
a piston ring assembly that is engaged with the bearing housing and extends into the annular groove of the shaft assembly, the piston ring assembly including a first ring portion and a second ring portion, the first ring portion having a first contact face that is oriented at a non-perpendicular angle with respect to the shaft axis, and the second ring portion having an outer surface that is engaged with the bearing housing and a second contact face that is oriented at a non-perpendicular angle with respect to the shaft axis and is engageable with the first contact face, wherein the first contact face is oriented such that it faces outward with respect to the shaft axis and the second contact face is oriented such that it faces inward with respect to the shaft axis.

11. The turbocharger of claim 10, wherein the first contact face defines a first angle with respect to the shaft axis, the second contact face defines a second angle with respect to the shaft axis, and the first angle and the second angle are supplementary angles.

12. The turbocharger of claim 10, wherein interaction of the first contact face and the second contact face causes expansion or contraction of an axial length of the piston ring assembly in response to changes in a thrust load applied to the shaft assembly.

13. The turbocharger of claim 10, wherein engagement of the piston ring assembly with the bearing housing restrains rotation of the piston ring assembly with respect to the bearing housing.

14. The turbocharger of claim 10, wherein the first ring portion includes an inner surface that is arranged around the shaft axis at a constant radius for sealing with respect to the shaft assembly.

15. The turbocharger of claim 10, wherein the second ring portion includes an outer surface that is arranged around the shaft axis at a constant radius for sealing with respect to the bearing housing.

16. The turbocharger of claim 10, wherein the first contact face and the second contact face are each defined as a portion of a conical surface having its axis aligned with the shaft axis.

17. An apparatus, comprising:
a stationary structure that defines a bore;
a rotating structure that is disposed within the bore of the stationary structure, extends along an axis and includes an annular groove that is formed on the rotating structure and extends around the axis; and
a piston ring assembly that is engaged with the stationary structure and extends into the annular groove of the rotating structure, the piston ring assembly including a first ring portion and a second ring portion, the first ring portion having a first contact face that is oriented at a non-perpendicular angle with respect to the axis, and the second ring portion having an outer surface that is engaged with the stationary structure and a second contact face that is oriented at a non-perpendicular angle with respect to the axis and is engageable with the first contact face, wherein the first contact face is oriented such that it faces outward with respect to the axis and the second contact face is oriented such that it faces inward with respect to the axis.

18. The apparatus of claim 17, wherein the first contact face defines a first angle with respect to the axis, the second contact face defines a second angle with respect to the axis, the first angle and the second angle are supplementary angles, the first contact face is oriented such that is faces outward with respect to the axis, the second contact face is oriented such that is faces outward with respect to the axis, and interaction of the first contact face and the second contact face causes expansion or contraction of an axial length of the piston ring assembly in response to changes in a thrust load applied to the rotating structure.

19. The apparatus of claim 17, wherein the first contact face and the second contact face are each defined as a portion of a conical surface having its axis aligned with the axis.

* * * * *